US011903551B2

(12) United States Patent
Paulla et al.

(10) Patent No.: US 11,903,551 B2
(45) Date of Patent: Feb. 20, 2024

(54) FLOOR CLEANER

(71) Applicant: Techtronic Cordless GP, Anderson, SC (US)

(72) Inventors: Kirti Kant Paulla, Indian Lane, SC (US); David Khalil, College Park, MD (US)

(73) Assignee: Techtronic Floor Care Technology Limited, Tortola (VG)

( * ) Notice: Subject to any disclaimer, the term of this patent is extended or adjusted under 35 U.S.C. 154(b) by 0 days.

(21) Appl. No.: 18/248,538

(22) PCT Filed: Oct. 12, 2021

(86) PCT No.: PCT/US2021/054520
§ 371 (c)(1),
(2) Date: Apr. 11, 2023

(87) PCT Pub. No.: WO2022/081540
PCT Pub. Date: Apr. 21, 2022

(65) Prior Publication Data
US 2023/0337876 A1 Oct. 26, 2023

Related U.S. Application Data

(60) Provisional application No. 63/090,508, filed on Oct. 12, 2020.

(51) Int. Cl.
*A47L 9/12* (2006.01)
*A47L 5/28* (2006.01)
(Continued)

(52) U.S. Cl.
CPC ............. *A47L 9/127* (2013.01); *A47L 5/28* (2013.01); *A47L 9/20* (2013.01); *B01D 39/14* (2013.01);
(Continued)

(58) Field of Classification Search
CPC ... A47L 9/127; A47L 5/28; A47L 9/20; B01D 39/14; B01D 46/0002; B01D 46/2411;
(Continued)

(56) References Cited

U.S. PATENT DOCUMENTS 6,709,495 B1 3/2004 Storer
7,799,103 B2 9/2010 Coburn
(Continued)

FOREIGN PATENT DOCUMENTS

CN 1600252 A 3/2005
CN 100539924 C 9/2009
(Continued)

OTHER PUBLICATIONS

International Search Report and Written Opinion for Application No. PCT/US2021/054520 dated Jan. 27, 2022 (14 pages).

*Primary Examiner* — David Redding
(74) *Attorney, Agent, or Firm* — Michael Best & Friedrich LLP (57) ABSTRACT

A floor cleaner with an air inlet, an air outlet, a suction motor, and a filter. The filter includes a first media layer, a second media layer, an end cap, and an annular cap. The first media layer and the second media layer extend along a filter axis between the end cap and the annular cap. The filter is compressible along the filter axis between the end cap and the annular cap.

33 Claims, 8 Drawing Sheets

(51) Int. Cl.
  *B01D 46/24* (2006.01)
  *B01D 46/64* (2022.01)
  *B01D 46/00* (2022.01)
  *B01D 39/14* (2006.01)
  *A47L 9/20* (2006.01)

(52) U.S. Cl.
  CPC ...... *B01D 46/0002* (2013.01); *B01D 46/2411* (2013.01); *B01D 46/64* (2022.01); *B01D 2239/0618* (2013.01); *B01D 2265/06* (2013.01); *B01D 2267/40* (2013.01); *B01D 2275/203* (2013.01); *B01D 2279/55* (2013.01)

(58) Field of Classification Search
  CPC ............ B01D 46/64; B01D 2239/0618; B01D 2265/06; B01D 2267/40; B01D 2275/203; B01D 2279/55
  See application file for complete search history.

(56) References Cited

U.S. PATENT DOCUMENTS

| | | |
|---|---|---|
| 8,308,831 B2 | 11/2012 | Coburn |
| 8,745,817 B2 | 6/2014 | Stein et al. |
| 2001/0018865 A1 | 9/2001 | Wegelin et al. |
| 2010/0242220 A1 | 9/2010 | Dyson et al. |

FOREIGN PATENT DOCUMENTS

| | | |
|---|---|---|
| CN | 101675872 A | 3/2010 |
| CN | 201734661 U | 2/2011 |
| CN | 102475523 A | 5/2012 |
| CN | 103156553 A | 6/2013 |
| CN | 103156554 A | 6/2013 |
| DE | 19704468 A1 | 8/1998 |
| EP | 2708173 A1 | 3/2014 |
| WO | 2010128625 A1 | 11/2010 |
| WO | 2015010085 A2 | 1/2015 |

FLOOR CLEANER

CROSS-REFERENCE TO RELATED APPLICATIONS

This application claims priority to U.S. Provisional Patent Application No. 63/090,508, filed Oct. 12, 2020, the entire contents of which are hereby incorporated by reference herein.

BACKGROUND

The present invention relates to floor cleaners, and more particularly, a compressible filter for a floor cleaner.

SUMMARY

In one embodiment a floor cleaner is disclosed including a fluid flow path extending from an air inlet to an air outlet, a suction motor positioned in the fluid flow path, and a cylindrical filter. The cylindrical filter includes a first media layer, a second media layer, an end cap, and an annular cap. The first media layer forms a hollow cylinder around an air passageway along a filter axis and has a first inner cylindrical portion and a first outer cylindrical portion extending between a first upper end and a first lower end. The second media layer forms a hollow cylinder around the first media layer, and has a second inner cylindrical portion and a second outer cylindrical portion extending between a second upper end and a second lower end. The end cap closes the first upper end and the second upper end. The annular cap closes the first lower end and the second lower end. The annular cap includes an aperture there through connecting the airflow path to the air passageway. The first media layer and the second media layer are compressible along the filter axis, between the end cap and the annular cap, and at least one of the first media layer and the second media layer is a resilient material.

In another embodiment, a floor cleaner is disclosed including a fluid flow path extending from an air inlet to an air outlet, a suction motor positioned in the fluid flow path, and a cylindrical filter disposed along the fluid flow path. The cylindrical filter includes a first media layer, a second media layer, an end cap, an annular cap, and a frame. The first media layer forms a hollow cylinder around an air passageway along a filter axis and has a first inner cylindrical portion and a first outer cylindrical portion extending between a first upper end and a first lower end. The second media layer forms a hollow cylinder around the first media layer, and has a second inner cylindrical portion and a second outer cylindrical portion extending between a second upper end and a second lower end. The end cap closes the first upper end, the second upper end, and the air passageway. The annular cap closes the first lower end and the second lower end. The annular cap includes an aperture there through connecting the airflow path to the air passageway. The frame extends between the end cap and the annular cap. The first media layer, the second media layer, and the frame are compressible along the axis.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

The present disclosure relates to a floor cleaner, specifically a filter for a floor cleaner. The performance of the filtration system of a floor cleaner is a contributing factor to the overall performance of the floor cleaner. Cleaning the filter extends filter life, as well as improves filtration performance. In one embodiment, the inventive filter includes two end caps integral with a filter media, a filter frame extending between the end caps, wherein the entire filter is compressible for cleaning and maintenance.

Figure 1:
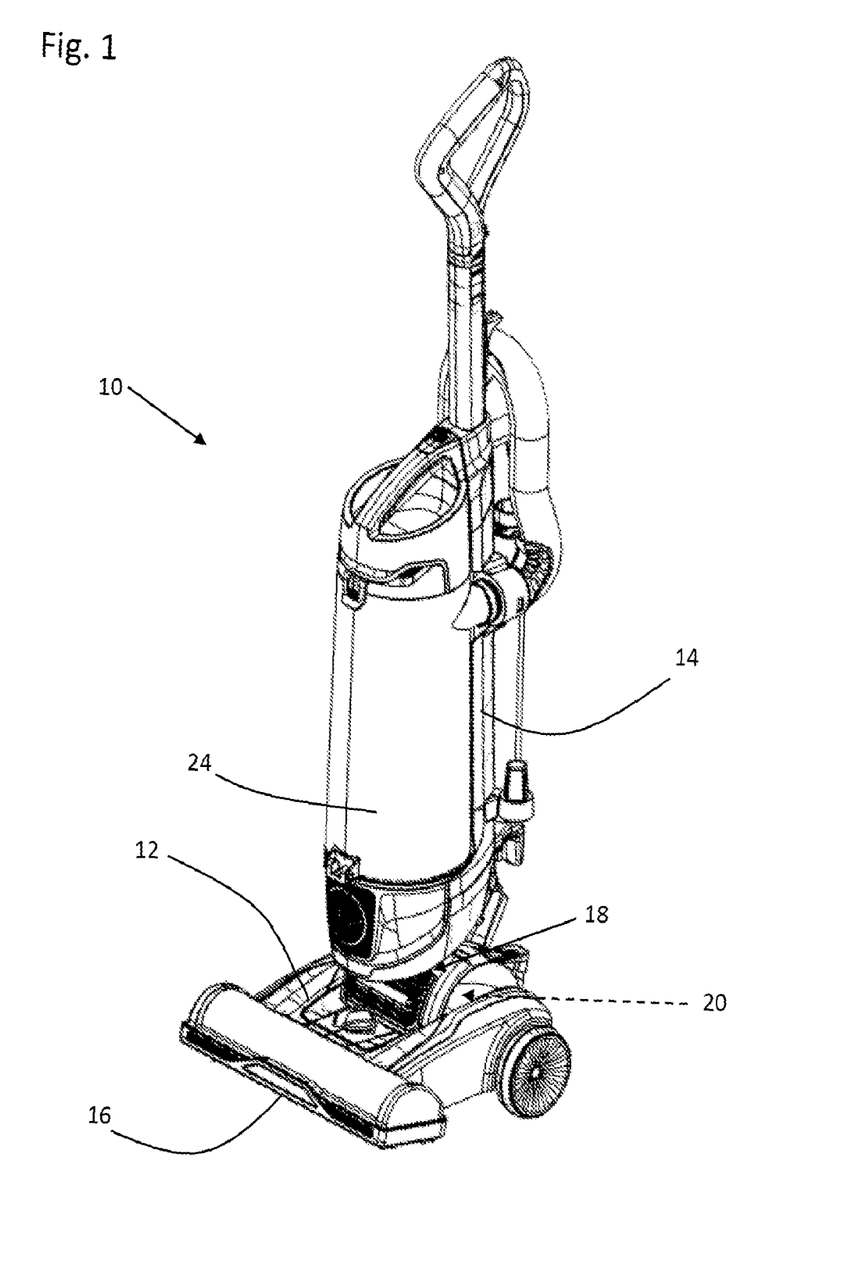
FIG. 1 is a perspective view of a floor cleaner according to one embodiment.
Figure 1A:
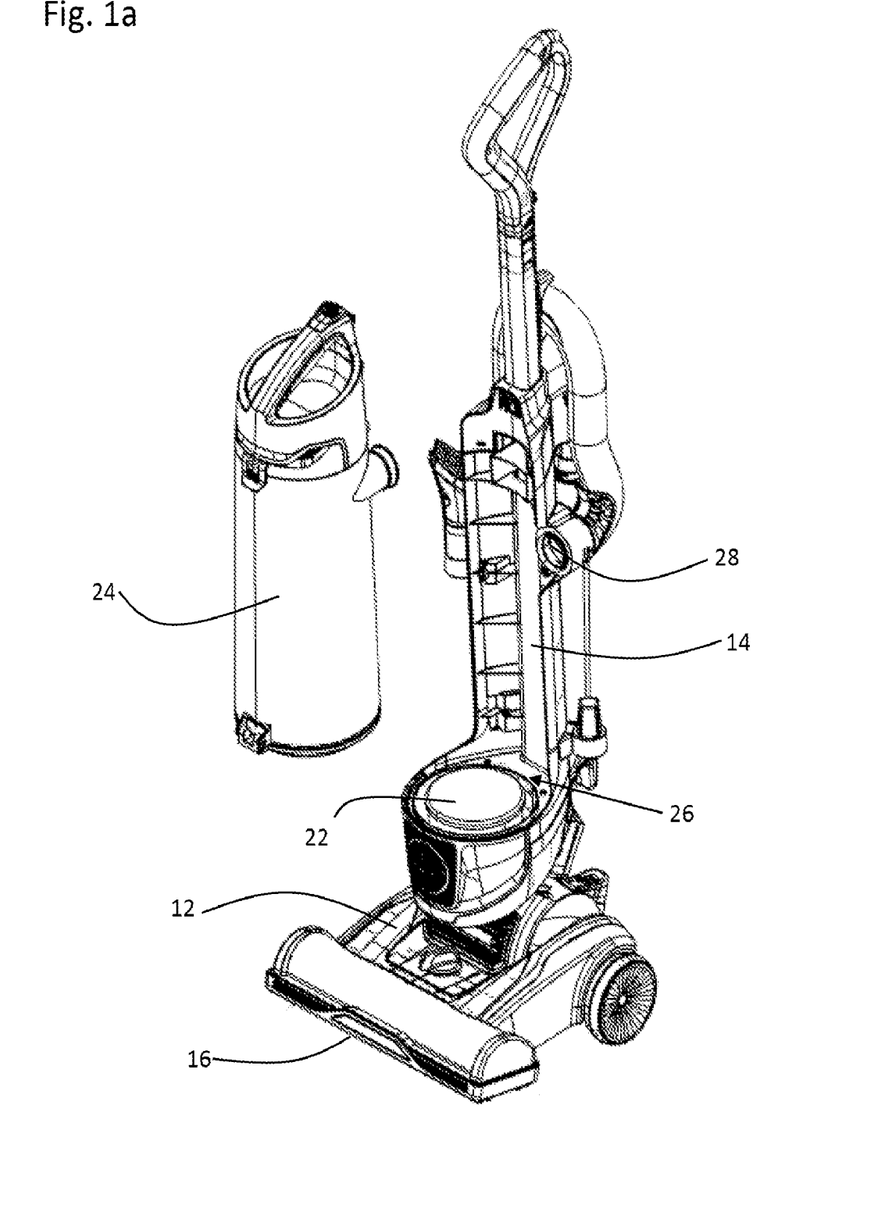
FIG. 1a is an exploded view of FIG. 1 showing a dust collection bin removed from the floor cleaner to expose a filter chamber.
Figure 2:
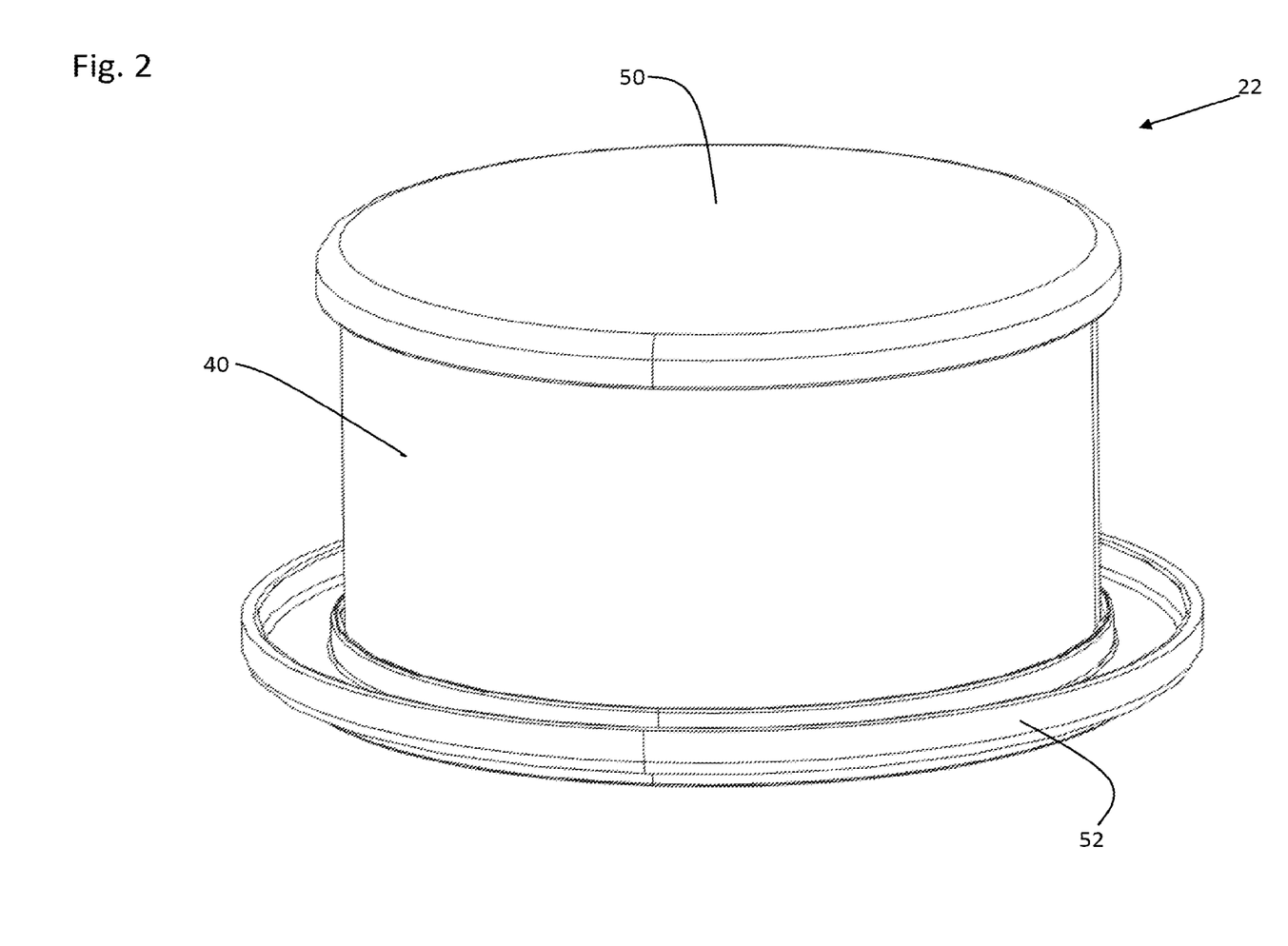
FIG. 2 is a perspective view of a cylindrical filter of the floor cleaner shown in FIG. 1.

FIG. 1 illustrates a perspective view of a floor cleaner 10 according to an embodiment of the invention. The floor cleaner 10 has a fluid flow path 28 extending from an air inlet 16 to an air outlet 18. The air inlet 16 is positioned on a foot 12 of the floor cleaner that is movable along a surface to be cleaned. The foot 12 is pivotably coupled to a body 14 of the floor cleaner 10. The floor cleaner 10 includes a suction motor 20 operable to generate an airflow along the fluid flow path 28 to draw debris from the surface to be cleaned through the air inlet 16. The floor cleaner 10 further includes a filter 22 along the fluid flow path configured to filter dirt-laden air. In the illustrated embodiment, the filter is a cylindrical filter 22, In one embodiment, the cylindrical filter 22 is upstream of the suction motor 20. In one embodiment, the cylindrical filter 22 is downstream of the suction motor 20.

The cylindrical filter 22 is positioned in a filter chamber 26. The filter chamber 26 includes a filter chamber inlet and a filter chamber outlet along the fluid flow path 28. The cylindrical filter 22 has a first media layer 30 forming a hollow cylinder 31 around an air passageway 64 along a filter axis 100, the air passageway 64 operatively positioned along the fluid flow path 28 between the filter chamber inlet and the filter chamber outlet. The filter axis 100 extends centrally through the hollow cylinder 31. In one embodiment, the cross-sectional shape of the cylindrical filter 22 perpendicular to the filter axis 100 is circular, substantially circular, or oval shaped. In another embodiment, the cross-sectional shape of the cylindrical filter 22 is noncircular. As used herein, cylindrical includes cylindrical shapes and similar shapes, for example conical and frustoconical. In the embodiment illustrated in FIG. 3, air exits the filter along the air passageway 64 through the center of the hollow cylinder 31 indicated by the arrows A toward the filter chamber exit (not shown).

The first media layer 30 has a first inner cylindrical portion 32 and a first outer cylindrical portion 34 extending between a first upper end 36 and a first lower end 38. In the embodiment illustrated in FIGS. 2-7, the cylindrical filter 22 further includes a second media layer 40 forming a hollow cylinder 31 around the first media layer 30. The second media layer 40 has a second inner cylindrical portion 42 and a second outer cylindrical portion 44 extending between a second upper end 46 and a second lower end 48. In one embodiment, the first outer cylindrical portion 34 is connected to the second inner cylindrical portion 42. In another embodiment, the first media layer 30 is separable from the second media layer 40. In one embodiment, the second media layer 40 is removable from the cylindrical filter. In one embodiment, the cylindrical filter 22 includes only one media layer. In another embodiment, the cylindrical filter 22 includes three or more media layers.

The cylindrical filter 22 further includes an end cap 50 positioned above the first media layer 30 and the second media layer 40 closing the first upper end 36 and the second upper end 46. In the embodiment illustrated in FIGS. 2-5, the end cap 50 is a piece formed of a rigid plastic material. In the embodiments illustrated in FIGS. 6 and 7, the end cap 50 is formed by a layer of an adhesive material or a film applied to the first and second upper ends 36, 46. In one embodiment, the end cap 50 is coupled to the first and second upper ends 36, 46, such as by adhesive, heat bonding, welding, or mechanical means such as a snap or catch mechanism. In the embodiments illustrated in FIGS. 2-5, the end cap 50 has a diameter $D_{EC}$ that is greater than the diameter $D_{ML}$ of the second media layer 40. In the embodiments illustrated in FIGS. 2-6, the end cap 50 closes the air passageway 64, as well as the first and second media layers 30, 40. In the embodiment shown in FIG. 7, the end cap 50 closes the first upper end 36 and the second upper end 46, while leaving the air passageway 64 open. In this embodiment, the air passageway 64 may remain open to cooperate with the fluid flow path 28 of the cleaner, or may be closed by another portion of the floor cleaner 10, such as a bottom wall of a dust collection bin 24, a cover, or other component. In the embodiments illustrated in FIGS. 3-5, the end cap 50 includes an end cap protrusion 60 that extends along the air passageway 64 adjacent the first upper end 36. The end cap protrusion 60 may assist in the assembly and coupling of the first media layer 30 and the second media layer 40 to the end cap 50 by properly locating the media layers relative to the end cap.

The cylindrical filter 22 further includes an annular cap 52 positioned below the first media layer 30 and the second media layer 40, opposite the end cap 50. The annular cap 52 closes the first lower end 38 and the second lower end 48. The annular cap 52 contactingly engages or is coupled to the first and second lower ends 38 and 48. The annular cap 52 has a diameter DAC that is greater than the diameter $D_{ML}$ of the second media layer 40. The annular cap 52 has an aperture 54 connecting the airflow path to the air passageway 64. In the embodiment illustrated in FIG. 5, the fluid flow path 28 extends through the aperture 54 and the air passageway 64, and the fluid flows radially through the first media layer 30 and the second media layer 40. In the embodiment illustrated in FIG. 3, the fluid flow path 28 extends radially through the second media layer 40 and the first media layer 30, then to the air passageway 64 and through the aperture 54. In the embodiments illustrated in FIGS. 3-7, the annular cap 52 includes an annular cap protrusion 62 that extends along the air passageway 64 adjacent the first lower end 38. The annular cap protrusion 62 may assist in the assembly and coupling of the first media layer 30 and the second media layer 40 to the annular cap 52 by properly locating the media layers relative to the annular cap. In one embodiment, the end cap 50 and the annular cap 52 are coupled or connected to the first media layer 30.

Figure 3:
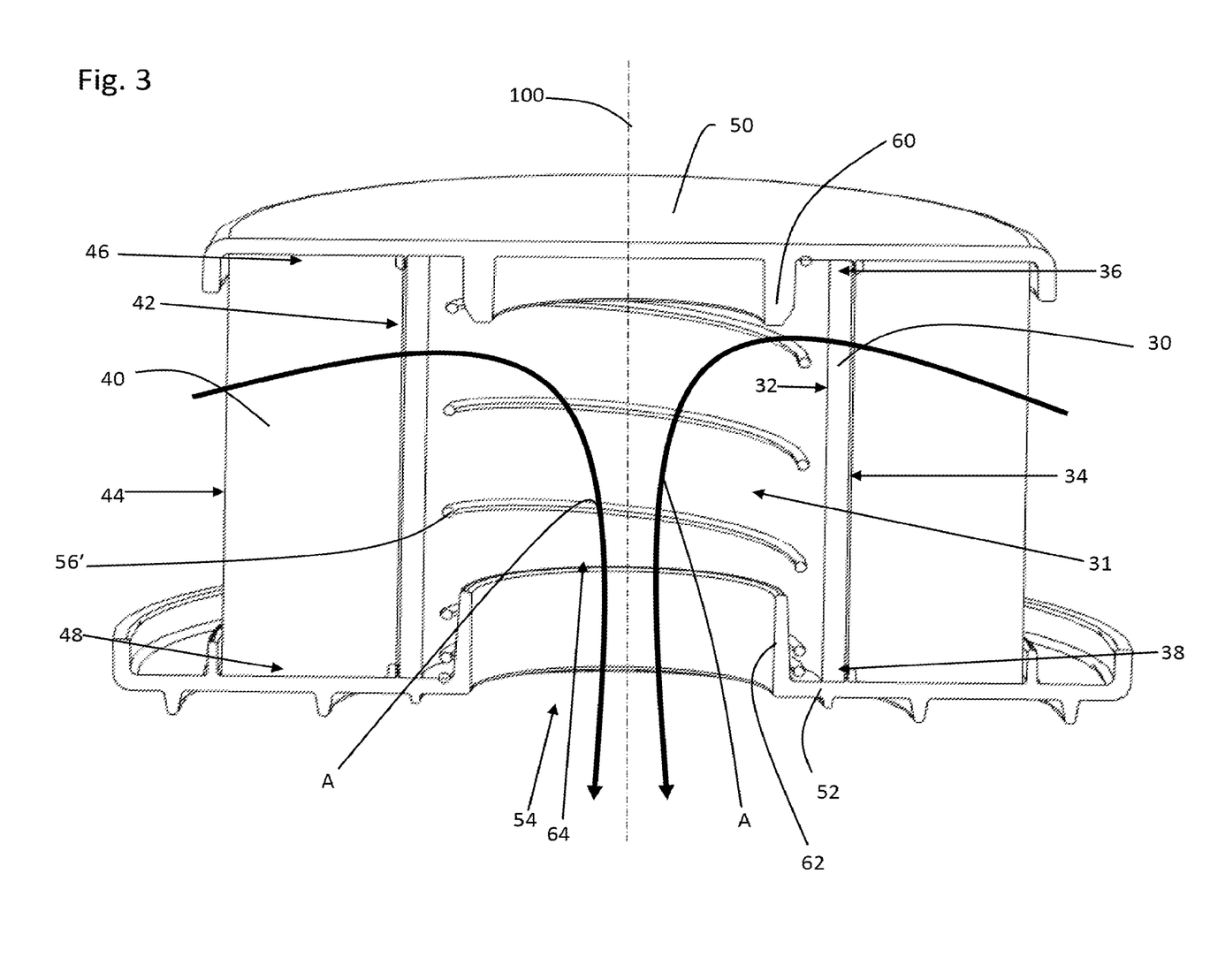
FIG. 3 is a cross-sectional view of the cylindrical filter shown in FIG. 2, according to one embodiment.
Figure 4:
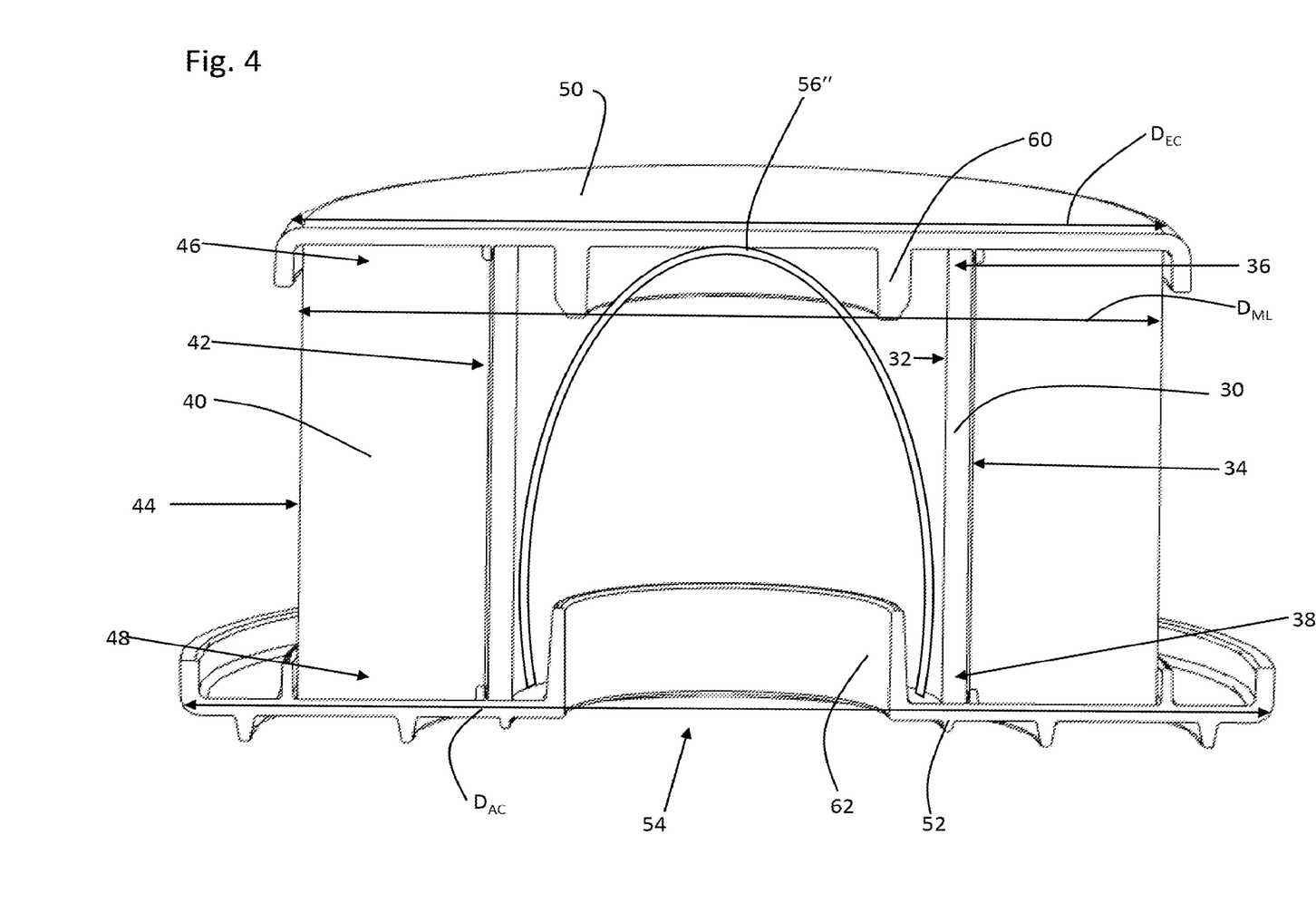
FIG. 4 is a cross-sectional view of the cylindrical filter shown in FIG. 2, according to another embodiment.

In the embodiment illustrated in FIGS. 3 and 4, the cylindrical filter 22 includes a frame 56 extending between the end cap 50 and the annular cap 52. The frame 56 is positioned along the filter axis 100, adjacent the first inner cylindrical portion 32. In the embodiments that include the end cap protrusion 60 and the annular cap protrusion 62, the respective protrusions 60 and 62 may act as a retaining and stabilizing feature for the frame 56.

The first media layer 30, the second media layer 40, and the frame 56 are compressible along the filter axis 100. The cylindrical filter 22 is compressed when a user applies a force to the end cap 50 and/or the annular cap 52 to move the two caps towards each other, compressing the first media layer 30, the second media layer 40, and the filter frame 56. In one embodiment, the frame includes a compressible spring 56' positioned or extending between the end cap 50 and the annular cap 52. In the embodiment illustrated in FIG. 3, the compressible spring 56' is a coil spring that cooperates with the end cap protrusion 60 along the air passageway 64. The coil spring 56' of FIG. 3 further cooperates with and surrounds the protrusion 62 of the annular cap 52. When no pressure is applied, the compressible spring 56' presses the first and second media layer 30 and 40 towards an uncompressed, use position (shown). In one embodiment, the filter frame 56 is a coil spring. In the embodiment illustrated in FIG. 4, the frame 56" is coupled to the annular cap 52 and is compressible, such as an arc-shaped polyoxymethylene (POM), acrylonitrile butadiene styrene (ABS), ethylene-vinyl acetate (EVA), polypropylene (PP), thermoplastic elastomer (TPE), thermoplastic polyurethane (TPU), polyurethane (PU) or the like. In the illustrated embodiment shown in FIG. 4, the frame 56" is roughly arc-shaped and extends substantially between the end cap 50 and the annular cap 52, but in other embodiments maybe linear in a diagonal or vertical direction to provide resilience with the selected material. The arc-shape or hoop shape of the frame 56" allows more rigid materials, such as POM to bend along the top of the arc or hoop in response to a compression force, and still provide resilience to press the cylindrical filter 22 toward the uncompressed position once the force is removed. The frame 56" is compressible with the first media layer 30 and the second media layer 40 in response to a compression force, and upon removal of the compression force, the frame 56" returns the cylindrical filter 22 to an uncompressed, use position (shown), by the resilience of one or more of the frame 56, the first media layer 30, and the second media layer 40.

Figure 5:
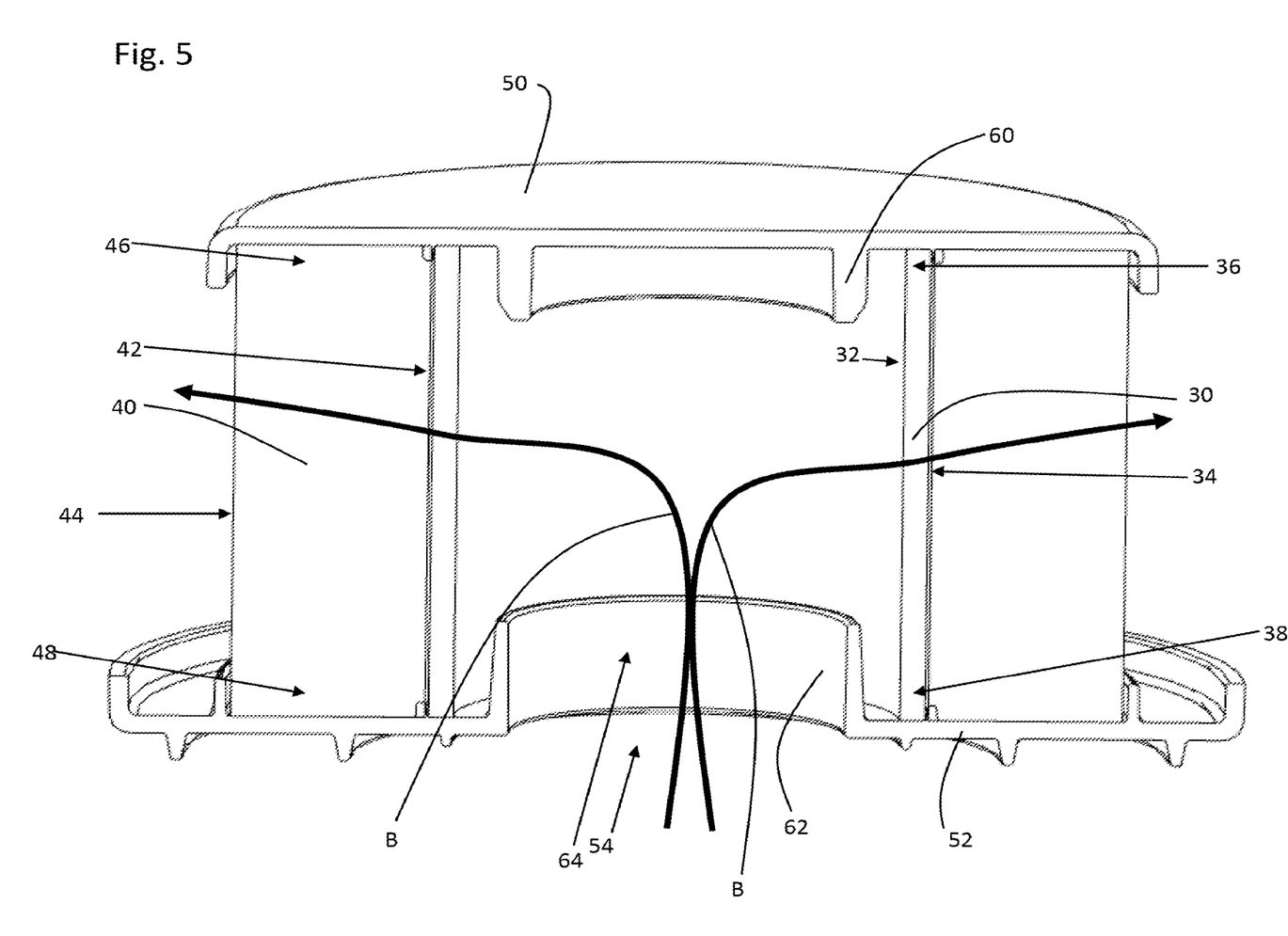
FIG. 5 is a cross-sectional view of the cylindrical filter shown in FIG. 2, according to another embodiment.
Figure 6:
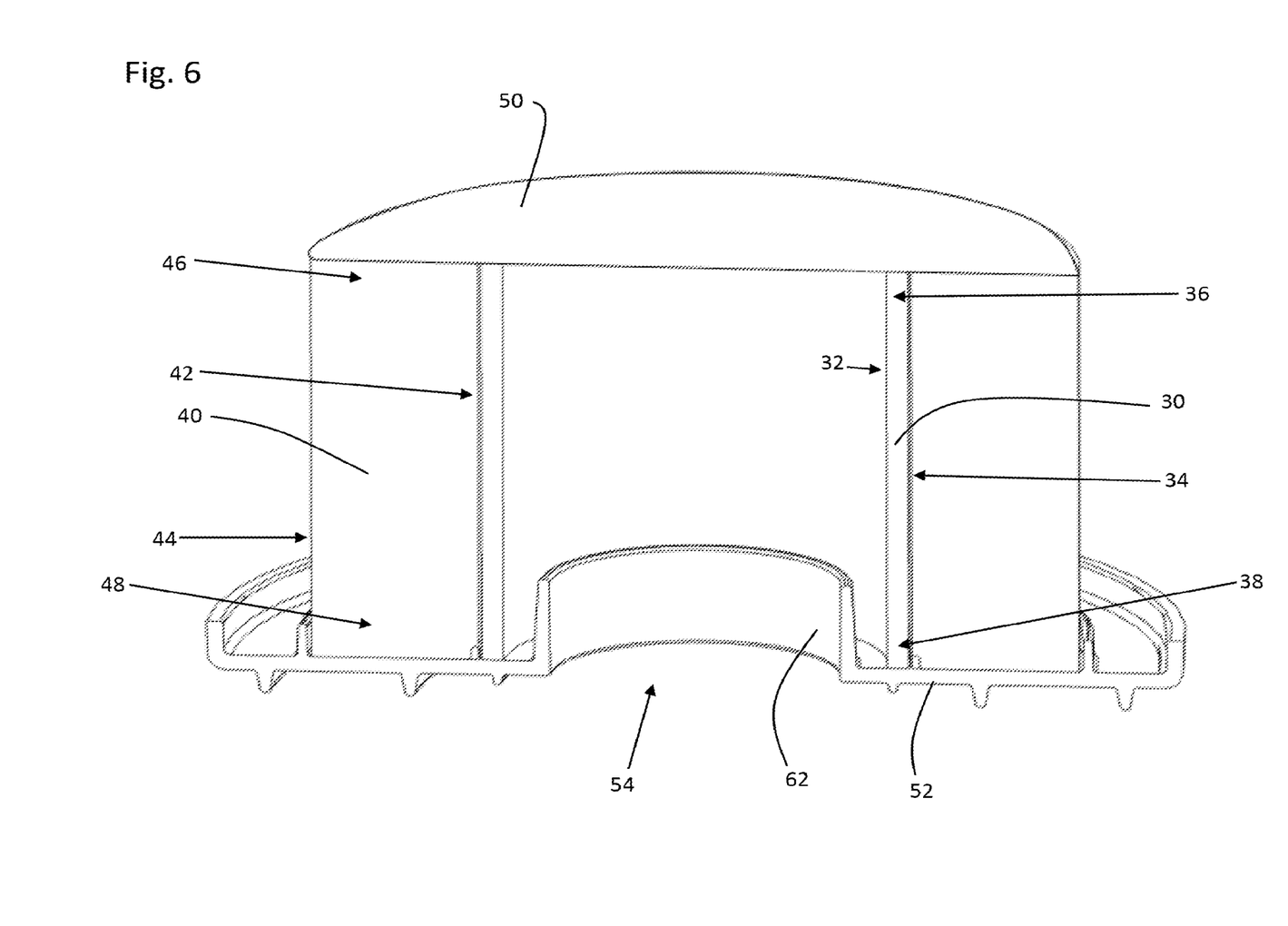
FIG. 6 is a cross-sectional view of the cylindrical filter shown in FIG. 2, according to another embodiment.
Figure 7:
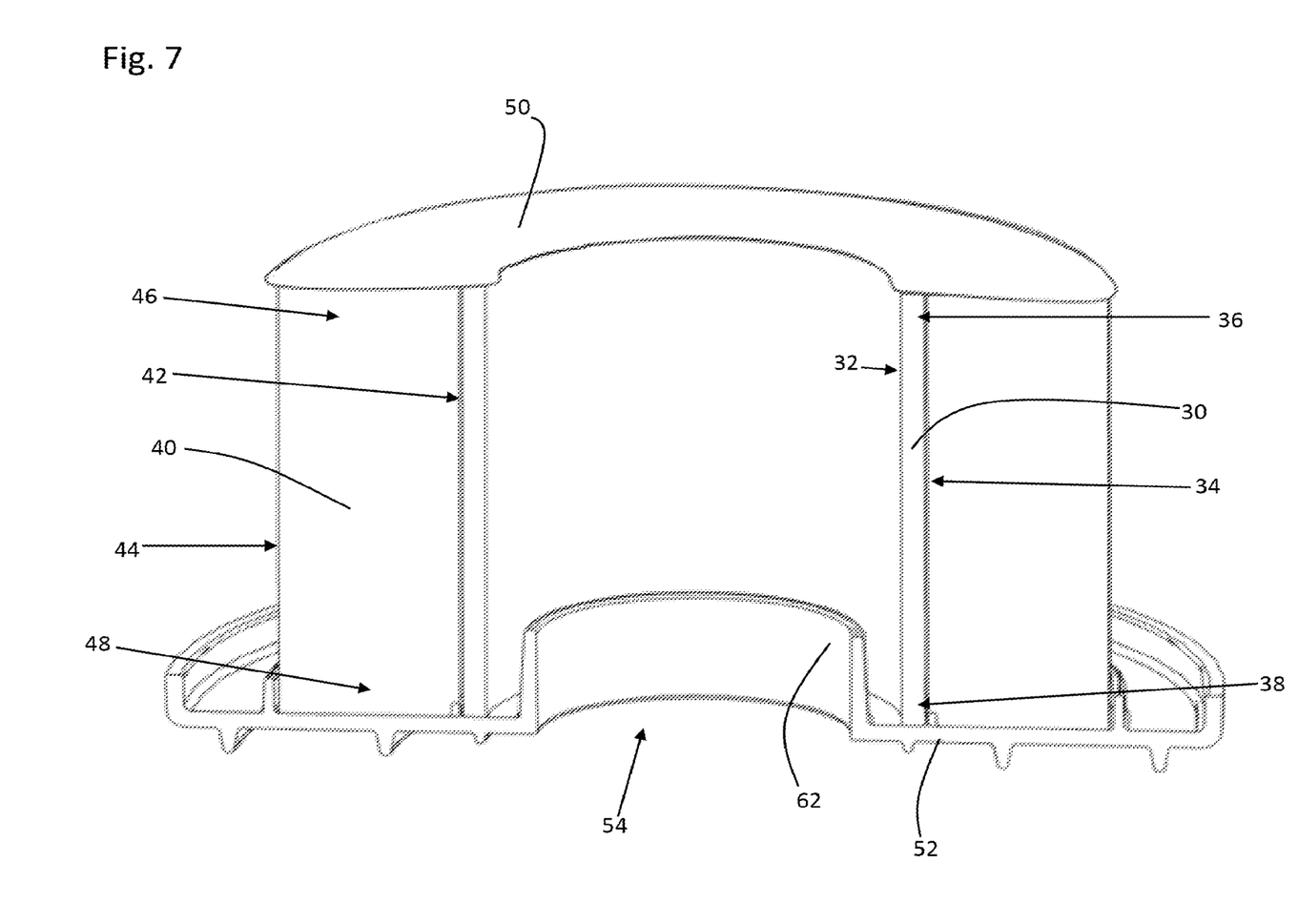
FIG. 7 is a cross-sectional view of the cylindrical filter shown in FIG. 2, according to another embodiment.

In another embodiment, illustrated in FIG. 5, there is no frame extending between the end cap 50 and the annular cap 52. Rather, the first media layer 30 and the second media layer 40 are both compressible along the filter axis 100, and at least one of the first media layer 30 and the second media layer 40 is a material with a resilient property, allowing cylindrical filter 22 to be compressed in response to a compression force and then to expand to its original size and shape once the force of compression is removed. In one embodiment, the first media layer 30 is resilient and the second media layer 40 is not resilient. In another embodiment, the first media layer 30 is not resilient and the second media layer 40 is resilient. In another embodiment, both the first media layer 30 and the second media layer 40 are resilient. In one embodiment, the first media layer 30 is a non-woven material and the second media layer 40 is a resilient foam material. The first media layer 30 and the second media layer 40 may also be any desired filter media, including pleated or non-pleated, non-woven fiber, foam, high-efficiency particular air filter (HEPA), or other media.

The compressibility of the cylindrical filter 22 is limited in some embodiments by the compressibility of the first media layer 30 and/or the second media layer 40, and is limited in other embodiments by the compressibility of the frame 56. In one embodiment, the first media layer 30 and the second media layer 40 are fully compressible, such that the end cap 50 and the annular cap 52 are adjacent in a substantially compressed position. In other embodiments, the first media layer 30 and the second media layer 40 are able to be compressed to between 25% and 50% of their uncompressed height, or between 15% and 45% of their uncompressed height.

The cylindrical filter 22 is disclosed herein with reference to an upright floor cleaner. However, the floor cleaner may be a canister vacuum, hand-held vacuum, stick vacuum, utility vacuum, or other floor cleaner utilizing a cylindrical filter.

Various features and advantages of the invention are set forth in the following claims.

What is claimed is:

1. A floor cleaner comprising:
   a fluid flow path extending from an air inlet to an air outlet;
   a suction motor operable to generate an airflow along the fluid flow path;
   a cylindrical filter disposed along the fluid flow path, the filter including:
      a first media layer forming a hollow cylinder around an air passageway along a filter axis, the first media layer having a first inner cylindrical portion and a first outer cylindrical portion extending between a first upper end and a first lower end of the first media layer;
      a second media layer forming a hollow cylinder around the first media layer, the second media layer having a second inner cylindrical portion and a second outer cylindrical portion extending between a second upper end and a second lower end of the second media layer;
      an end cap closing the first upper end, the second upper end, and the air passageway;
      an annular cap closing the first lower end and the second lower end, the annular cap having an aperture connecting the airflow path to the air passageway; and
      a frame extending between the end cap and the annular cap;
      wherein the first media layer, the second media layer, and the frame are compressible along the axis.

2. The floor cleaner according to claim 1, wherein the frame includes a compressible spring extending between the end cap and the annular cap.

3. The floor cleaner according to claim 2, where the frame is a coil spring.

4. The floor cleaner according to claim 1, wherein the end cap has a diameter greater than a diameter of the second media layer.

5. The floor cleaner according to claim 1, wherein the annular cap has a diameter greater than a diameter of the second media layer.

6. The floor cleaner according to claim 1, wherein the first outer cylindrical portion is connected to the second inner cylindrical portion.

7. The floor cleaner according to claim 1, wherein the fluid flow path extends through the aperture and the air passageway and radially through the first media layer and the second media layer.

8. The floor cleaner according to claim 1, wherein the fluid flow path extends radially through the second media layer and the first media layer, the air passageway and through the aperture.

9. The floor cleaner according to claim 1, wherein the end cap includes a protrusion extending along the air passageway adjacent the first upper end, wherein the frame surrounds the protrusion.

10. The floor cleaner according to claim 9, wherein the frame is a coil spring and the protrusion of the end cap cooperates with the coil spring.

11. The floor cleaner according to claim 1, wherein the annular cap includes a protrusion extending along the air passageway adjacent the first lower end, wherein the frame surrounds the protrusion.

12. The floor cleaner according to claim 11, wherein the frame is a coil spring and the protrusion of the annular cap cooperates with the coil spring.

13. The floor cleaner according to claim 1, wherein the end cap and the annular cap are connected to the first media layer.

14. A floor cleaner comprising:
   a fluid flow path extending from an air inlet to an air outlet;
   a suction motor operable to generate an airflow along the fluid flow path;
   a cylindrical filter disposed upstream of the suction motor, the cylindrical filter including:
      a first media layer forming a hollow cylinder around an air passageway along a filter axis, the first media layer having a first inner cylindrical portion and a first outer cylindrical portion extending between a first upper end and a first lower end of the first media layer;
      a second media layer forming a hollow cylinder around the first media layer, the second media layer having a second inner cylindrical portion and a second outer cylindrical portion extending between a second upper end and a second lower end of the second media layer;
      an end cap closing the first upper end and the second upper end;
      an annular cap closing the first lower end and the second lower end, the annular cap having an aperture connecting the airflow path to the air passageway;
      wherein the first media layer and the second media layer are compressible along the filter axis, between the end cap and the annular cap, and wherein at least one of the first media layer and the second media layer is a resilient material.

15. The floor cleaner according to claim 14, wherein the cylindrical filter includes a frame extending between the end cap and the annular cap.

16. The floor cleaner according to claim 15, wherein the frame includes a compressible spring extending between the end cap and the annular cap.

17. The floor cleaner according to claim 15, wherein the frame is a coil spring.

18. The floor cleaner according to claim 14, wherein the end cap closes the air passageway.

19. The floor cleaner according to claim 14, wherein the end cap has a diameter greater than a diameter of the second media layer.

20. The floor according to claim 14, wherein the annular cap has a diameter greater than a diameter of the second media layer.

21. The floor cleaner according to claim 14, wherein the first outer cylindrical portion is connected to the second inner cylindrical portion.

22. The floor cleaner according to claim 14, wherein the first outer cylindrical portion is separable from the second inner cylindrical portion.

23. The floor cleaner according to claim 14, wherein the fluid flow path extends through the aperture and the air passageway and radially through the first media layer and the second media layer.

24. The floor cleaner according to claim 14, wherein the fluid flow path extends radially through the second media layer and the first media layer, the air passageway, and through the aperture.

25. The floor cleaner according to claim 14, wherein the end cap includes a protrusion extending along the air passageway adjacent the first upper end.

26. The floor cleaner according to claim 14, wherein the annular cap includes a protrusion extending along the air passageway adjacent the first lower end.

27. The floor cleaner according to claim 25, further comprising a coil spring extending between the end cap and the annular cap cooperating with the end cap protrusion along the air passageway.

28. The floor cleaner according to claim 14, wherein the end cap and the annular cap are connected to the first media layer.

29. The floor cleaner according to claim 14, wherein the first media layer is a non-woven material and the second media layer is a resilient foam material.

30. The floor cleaner according to claim 14, wherein the end cap is an elastomeric material.

31. The floor cleaner according to claim 14, wherein the end cap is formed by a layer of an adhesive material or a film.

32. The floor cleaner according to claim 1, wherein the cylindrical filter is disposed upstream from the suction motor.

33. The floor cleaner according to claim 1, wherein the cylindrical filter is disposed downstream from the suction motor.

* * * * *